United States Patent [19]

Coupart et al.

[11] Patent Number: 5,856,716
[45] Date of Patent: Jan. 5, 1999

[54] COOLING CASE FOR AN ELECTRICAL DEVICE, AND A METHOD OF MANUFACTURING IT

[75] Inventors: Eric Coupart, Angouleme; Michel Galais, Puymoyen La Couronne; Guy Lamaison, Chateauneuf, all of France

[73] Assignee: Moteurs Leroy-Somer, Angouleme Cedex, France

[21] Appl. No.: 804,984

[22] Filed: Feb. 27, 1997

[30] Foreign Application Priority Data

Feb. 28, 1996 [FR] France .................................. 96 02503

[51] Int. Cl.⁶ ..................................................... H02K 5/20
[52] U.S. Cl. .......................... 310/54; 165/104.33; 310/58; 361/699
[58] Field of Search .............................. 174/15.1; 310/52, 310/54, 57–59, 64, 65; 62/259.2; 165/80.3, 80.4, 185, 104.33; 361/688, 689, 690, 694, 704; 29/596

[56] References Cited

U.S. PATENT DOCUMENTS

| | | |
|---|---|---|
| 3,009,072 | 11/1961 | Mossay . |
| 3,184,624 | 5/1965 | Solomon .................................. 310/57 |
| 3,242,359 | 3/1966 | Anderson .................................. 310/57 |
| 3,714,478 | 1/1973 | Demania .................................. 310/57 |
| 4,633,371 | 12/1986 | Nagy ...................................... 361/699 |
| 4,785,211 | 11/1988 | Erickson .................................. 310/57 |
| 4,797,588 | 1/1989 | Capion ..................................... 310/57 |
| 5,586,004 | 12/1996 | Green ..................................... 361/699 |
| 5,616,973 | 4/1997 | Khazanov ................................. 310/54 |

FOREIGN PATENT DOCUMENTS 0 177 925   4/1986   European Pat. Off. .
0 631 365   12/1994  European Pat. Off. .

*Primary Examiner*—Gerald Tolin
*Attorney, Agent, or Firm*—Young & Thompson

[57] ABSTRACT

A cooling case for an electrical device, the case comprising:

- a thermally conductive inner ferrule for surrounding the electrical device;
- an outer enclosure adjacent to the outside surface of the inner ferrule and including a feed inlet and an exhaust outlet for a cooling fluid, the enclosure being in the form of a plurality of undulations; and
- a passage for the cooling fluid extending from the inlet to the outlet; the plurality of undulations cooperating with the inner ferrule to define said passage, the cooling fluid being suitable for coming into thermal contact with the inner ferrule.

The undulations are formed in such a manner that the passage includes two substantially parallel sections that communicate with each other at one end such that the fluid inlet and the fluid outlet are located substantially towards the same free opposite ends of said sections.

19 Claims, 5 Drawing Sheets

COOLING CASE FOR AN ELECTRICAL DEVICE, AND A METHOD OF MANUFACTURING IT

FIELD OF THE INVENTION

The invention relates to a cooling case for an electrical device, to a rotary machine including such a case, and also to a method of manufacturing such a case.

The invention applies in particular to cooling cases for electric motors that are to be used in conditions where any movement of air is to be avoided, or when the motor is in a completely closed enclosure and needs to be cooled remotely.

That said, the invention applies more generally to using fluid to cool any type of electrical device.

BACKGROUND OF THE INVENTION

Electrical device cooling cases are known that comprise:

thermally conductive inner ferrule for surrounding the electrical device;

an outer enclosure adjacent to the outside surface of the inner ferrule, and including a feed inlet and an exhaust outlet for a cooling fluid; and a passage for the cooling fluid from the inlet to the outlet.

The cooling fluid then circulates through the outer enclosure passing in succession via the inlet, the passage, and the outlet.

In those known cooling cases, the outer enclosure is generally either a pipe of copper or of stainless steel wound helically around the case, or else a channel inserted in the mold for making the case, and existing in the thickness thereof.

In either case, that type of structure means that there are in fact two distinct walls between the cooling fluid and the motor that is to be cooled. The exchange of heat that takes place for the purpose of cooling the motor is therefore not optimal.

Also, in the first case, the structure requires a part to be added that is relatively complex to make since the channel defined by the pipe is closed. It is therefore necessary to make that part by molding.

In the second case, there is no add-on part, but manufacture is performed likewise by molding and is thus relatively complex.

In both cases, the cooling fluid does not come into direct contact with the inner ferrule, and given the structure of the channel formed by the pipe or by the making of the mold, the heat transfer area is relatively small, since it is solely tangential.

European patent application 0 631 365 describes a motor cooling case comprising an outer cylinder and an inner cylinder made from sheet metal plates deformed to obtain a passage for the cooling liquid between the two cylinders once the ends of the plates have been welded together. The case is a force-fit on the structure of the motor.

OBJECTS AND SUMMARY OF THE INVENTION

The invention seeks to mitigate the above-mentioned drawbacks.

To this end, it provides a cooling case of the kind described above that makes it possible to obtain a much greater heat exchange area, thereby sweeping over the inner ferrule completely.

The invention also relates to such a case in which it is possible to obtain a minimal flow rate for the cooling fluid, thus increasing the travel time of the cooling fluid while nevertheless ensuring good convective heat exchange between the fluid and the walls.

Finally, the invention also relates to a case as described above that is simple to manufacture and easy to install.

To this end, the invention provides a cooling case for an electrical device, the case comprising:

a thermally conductive inner ferrule for surrounding the electrical device;

an outer enclosure adjacent to the outside surface of the inner ferrule and including a feed inlet and an exhaust outlet for a cooling fluid, the enclosure being in the form of a plurality of undulations; and a passage for the cooling fluid extending from the inlet to the outlet; the plurality of undulations cooperating with the inner ferrule to define said passage, the cooling fluid being suitable for coming into thermal contact with the inner ferrule.

According to the invention, the undulations are formed in such a manner that the passage includes two substantially parallel sections that communicate with each other at one end, such that the fluid inlet and the fluid outlet are located substantially towards the same free opposite ends of said sections.

Thus, the cooling fluid flows in a first direction in the first section and in a second direction in the second section, thereby obtaining a substantially constant temperature over the ferrule as a whole.

When the ferrule is a body of revolution, the undulations can be such that the passage extends in a plane that is substantially perpendicular to the axis of revolution of the ferrule.

If the ferrule is substantially cylindrical in shape, the passage created around the ferrule can be helical in shape.

Thus, the passage extends over the entire surface of the ferrule, thereby further increasing the heat exchange area.

The invention thus relates to an electrical rotary machine including such a case that is intended to surround the stator of the machine.

Finally, the invention relates to a method of manufacturing such a case, in which:

the undulations are created by plastic deformation of the outer enclosure;

the inner ferrule is fitted inside the outer enclosure deformed in this way; and the outer enclosure is welded to the inner ferrule in leakproof manner via their ends.

The inner ferrule is fitted inside the outer enclosure without clearance.

In an implementation, a base element for forming the outer enclosure is positioned in tooling having undulations on its inside faces that are complementary in shape to the undulations that are to be obtained;

an element of substantially incompressible material is placed inside the outer enclosure against its inside walls;

the element is compressed so as to deform the walls of the outer enclosure and obtain the undulations;

the element is withdrawn; and the inner ferrule is fitted in the outer enclosure while positioned in the tooling which then has the function of holding the outer enclosure in its deformed state.

BRIEF DESCRIPTION OF THE DRAWINGS

The invention will be better understood from the following description of embodiments given purely as non-limiting examples, and with reference to the accompanying drawings, in which.

MORE DETAILED DESCRIPTION

Figure 1:
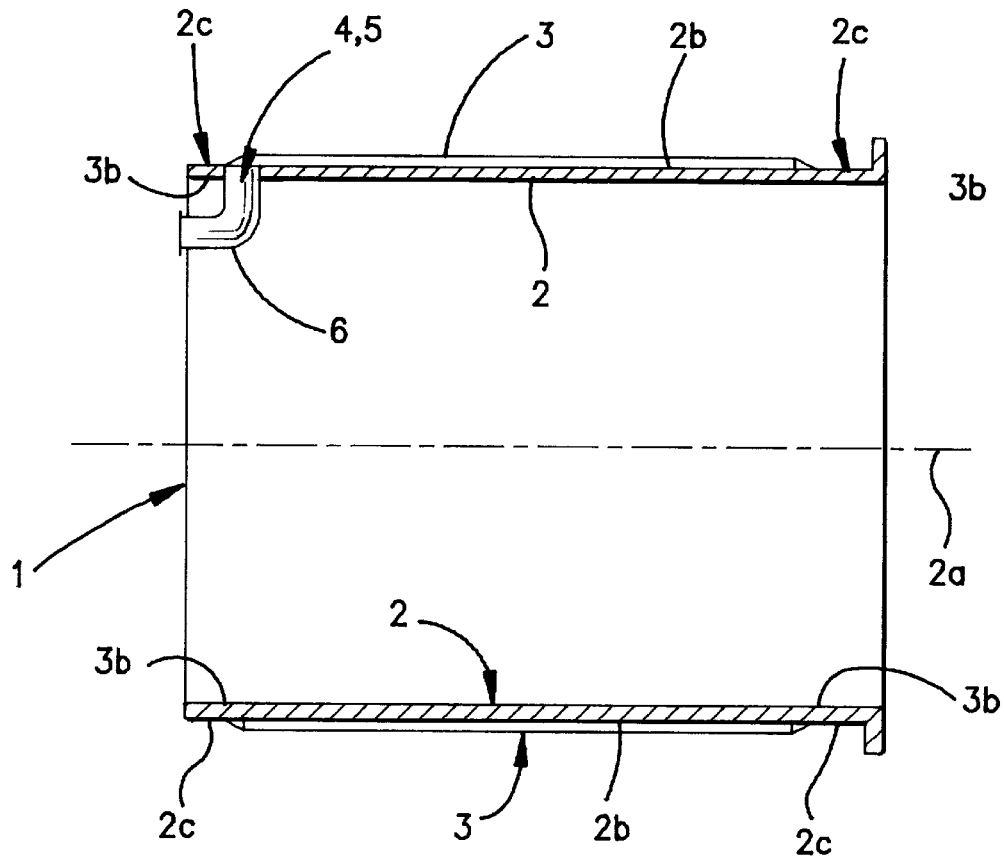
FIG. 1 is a cross-section view of a case of the invention from which the undulations have been omitted for simplification purposes.

The cooling case 1 is intended to be used for cooling electrical devices such as electrical rotary machines, for example, that can be cooled only by means of a cooling fluid.

The cooling fluid used may be a liquid or a gas.

The cooling case 1 includes a thermally conductive inner ferrule 2 for surrounding the electrical device.

The inner ferrule 2 may be of various different shapes, and in particular it may be a body of revolution about an axis of revolution 2a.

It may surround merely the portion of the electrical device that is to be cooled, or it may surround the entire electrical device.

For example, when the device is an electrical rotary machine, the portion to be cooled is the stator.

Also, for an electrical rotary machine, the most practical shape for the inner ferrule 2 is a substantially cylindrical shape.

Since the inner ferrule 2 is designed to come into contact with the cooling fluid, it is preferably made of a material that is not sensitive to corrosion, such as a metal alloy that withstands corrosion, for example.

The case 1 also includes an outer enclosure 3 adjacent to the outside surface 2b of the inner ferrule 2.

The outer enclosure 3 has a feed inlet 4 and an exhaust outlet 5 for the cooling fluid. It too is preferably made of a material that withstands corrosion.

The case 1 finally includes a passage 6 for the cooling fluid and extending from the inlet 4 to the outlet 5.

According to the invention, the outer enclosure 3 is in the form of a plurality of corrugations or undulations 7 that co-operate with the inner ferrule 2 to define the passage 6.

The fluid can thus come into thermal contact with the inner ferrule 2.

In a first embodiment, the undulations 7 are such that the passage 6 extends in a plane that is substantially perpendicular to the axis of revolution 2a of the inner ferrule 2.

However, other embodiments are possible in which the passage 6 extends, for example, substantially parallel to the axis of revolution 2a of the ferrule 2.

Figure 2:
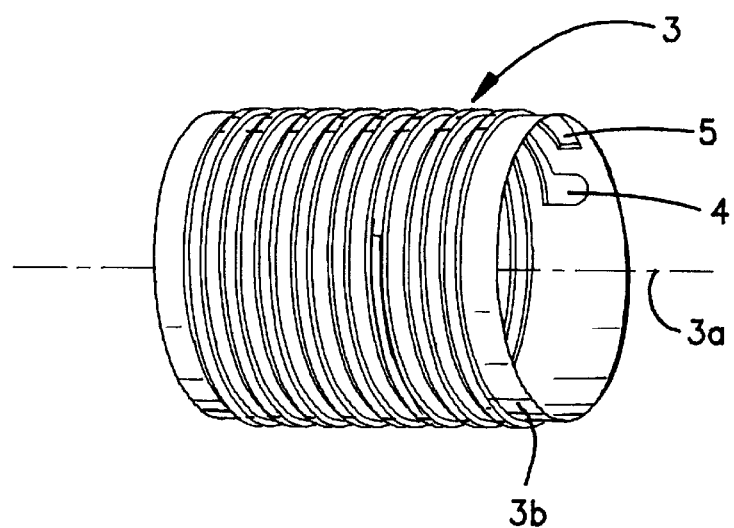
FIG. 2 is a perspective view of the outer enclosure of a case of the invention.
Figure 3:
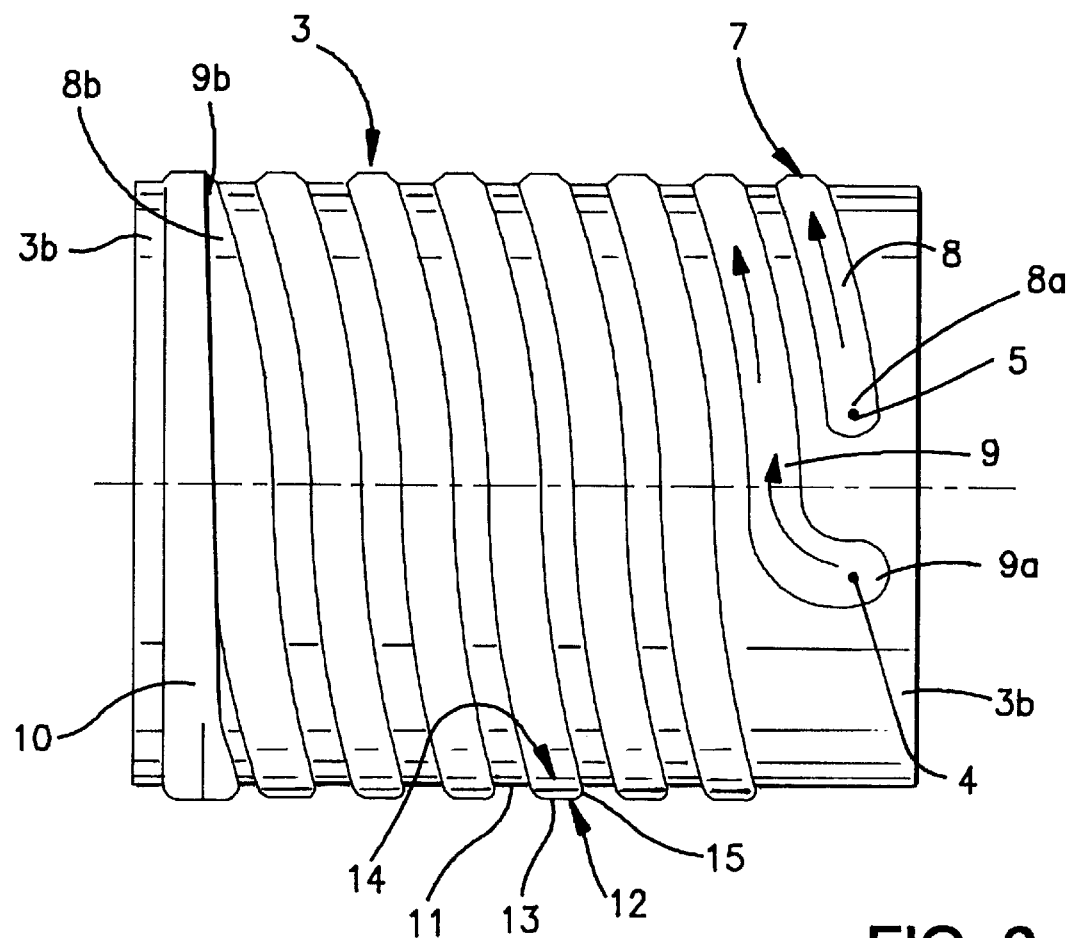
FIG. 3 is a section view on line III—III of FIG. 2.
Figure 4:
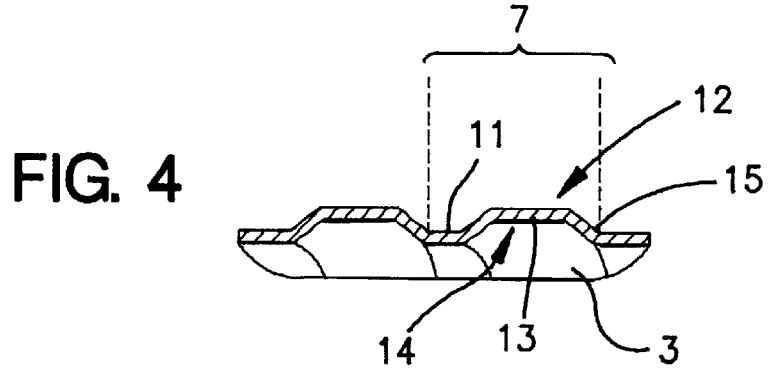
FIG. 4 is a fragmentary view on a larger scale of the undulations shown in FIGS. 2 and 3.
Figure 5:
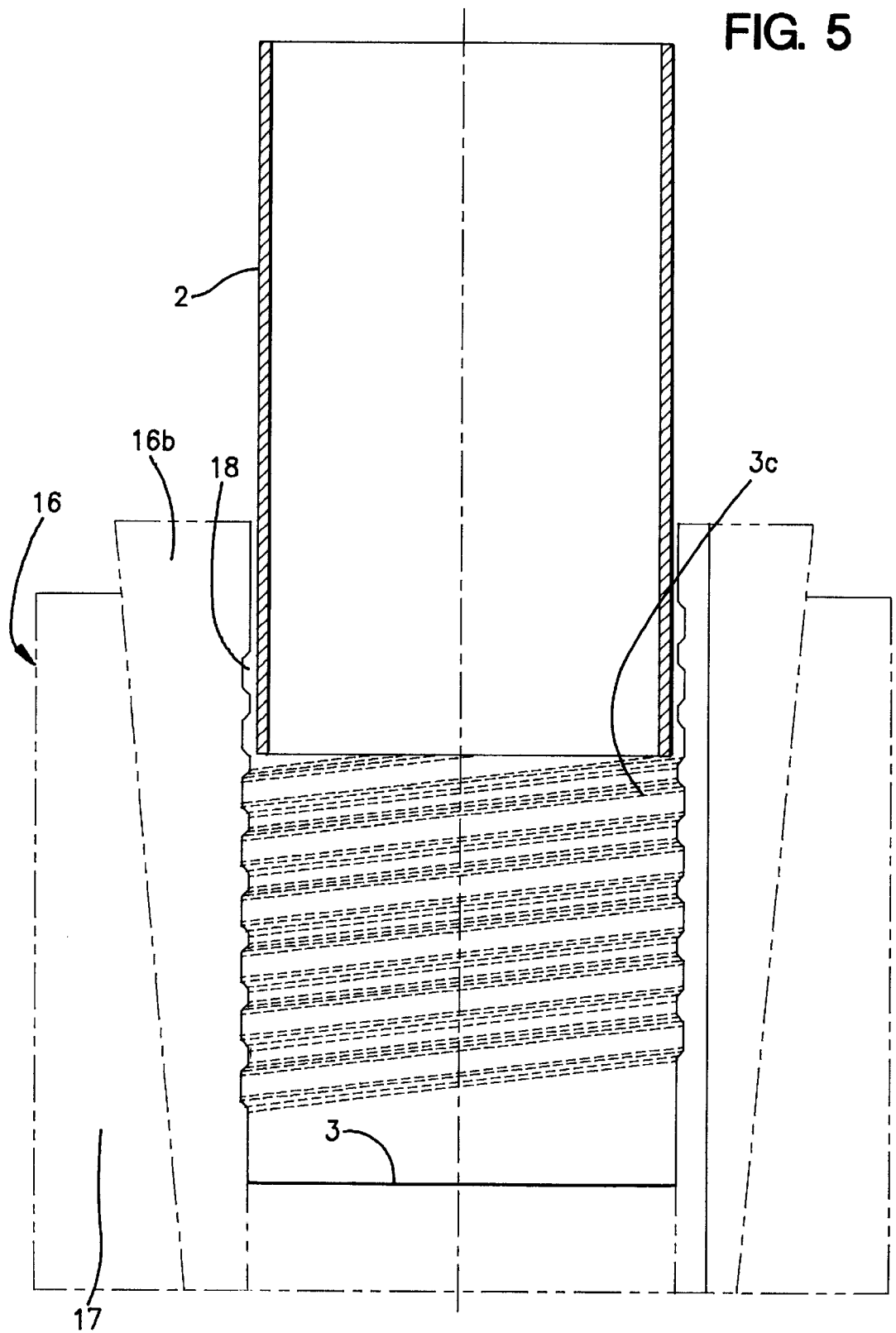
FIG. 5 is a cross-section view of tooling used for manufacturing a case of the invention, after the outer enclosure has been deformed.
Figure 6A:
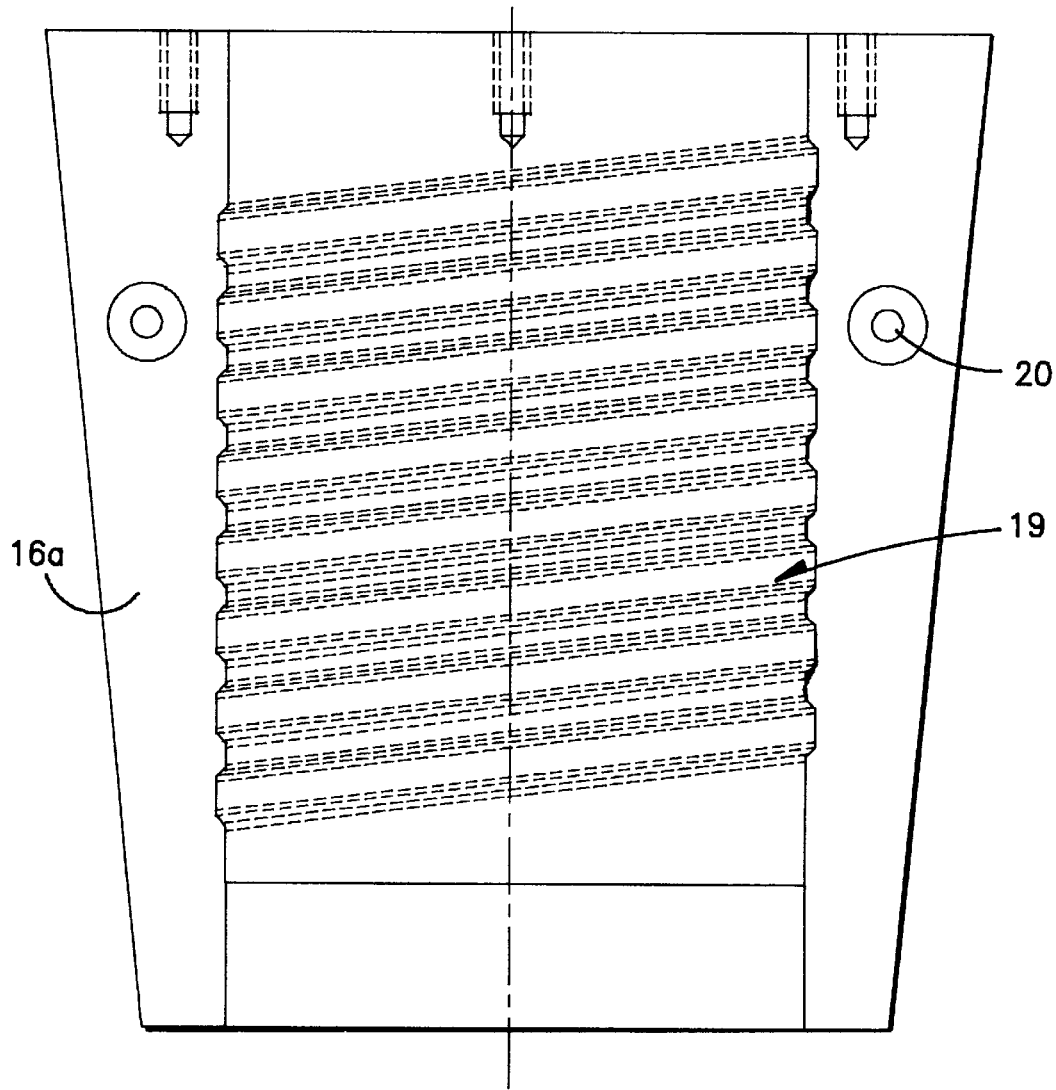
FIGS. 6a and 6b are cross-section views of two matrices of the tooling of FIG. 5.
Figure 6B:
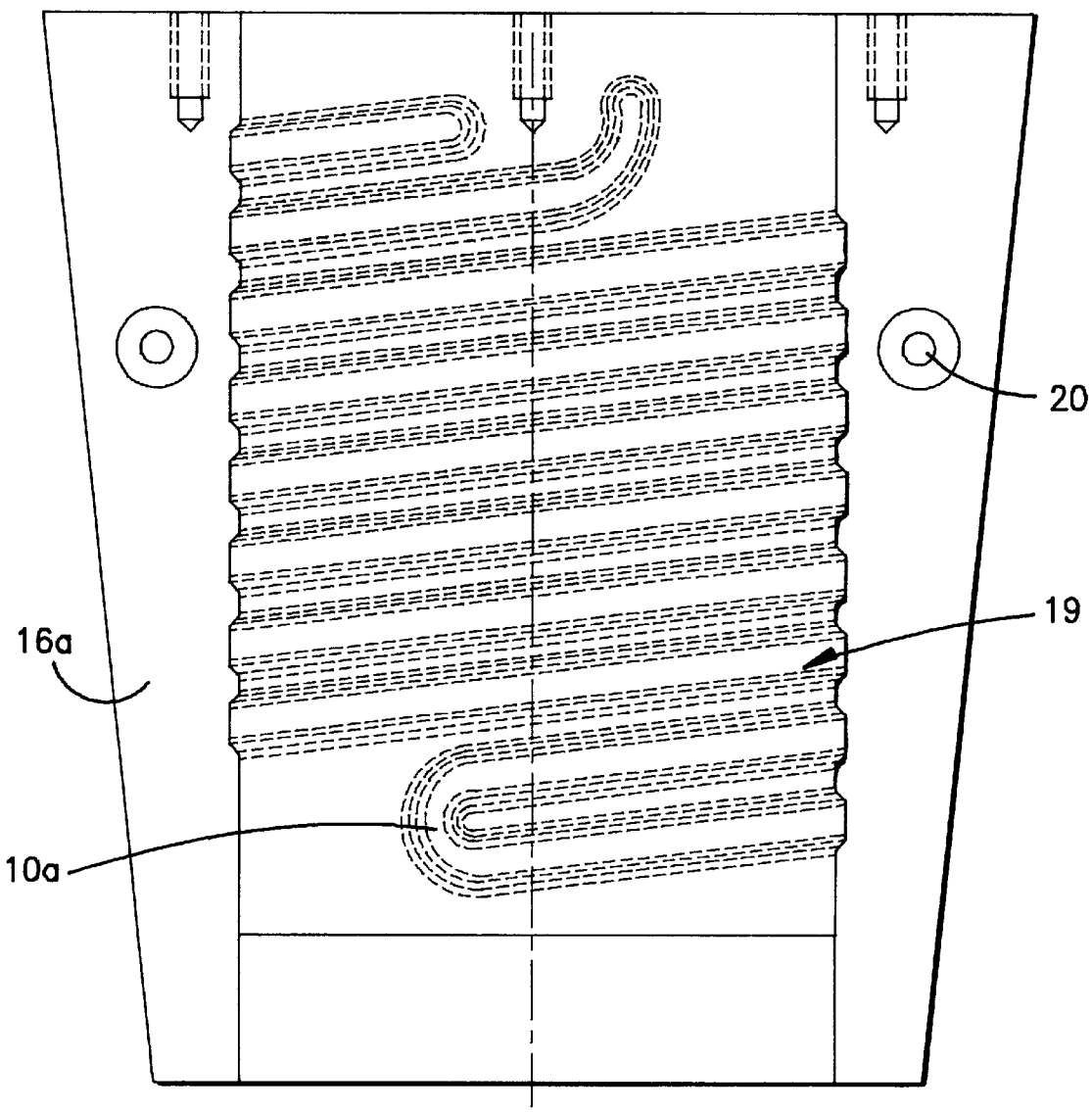

In the example shown in FIGS. 2 and 3, it can be seen that the passage 6 extends in a plane perpendicular to the axis of revolution 2a and is also helical in shape, and thus perceptibly inclined relative to the axis of revolution 2a.

It is also possible to provide for the undulations 7 to be such that the passage 6 extends exactly perpendicularly to the axis of revolution 2a.

In another embodiment, as shown in FIG. 3, for example, the undulations 7 are such that the passage 6 includes two sections 8 and 9 that are substantially parallel and that communicate with each other at one end 8a, 9a, such that the fluid inlet 4 and the fluid outlet 5 are located towards the same opposite free ends 8b, 9b of said sections 8 and 9.

Communication between the two sections 8 and 9 can be obtained, for example, by means of a ring 10 or of a bend 10a.

The undulations 7 of the invention thus define a coil that is in the form of a "two-start" thread, with the threads being connected together at one end.

Also, to facilitate connection with an external source of fluid (not shown), the two free ends 8b and 9b of the sections 8 and 9 of the passage 6 are located close to each other in a plane that is substantially perpendicular to the longitudinal axis 2a of the outer enclosure 3.

The undulations 7 may include first portions 11 in contact with the outside surface 2b of the inner ferrule 2 and second portions 12 remote from the outside surface 2b of the inner ferrule 2 and co-operating with the inner ferrule 2 to define the passage 6.

In one embodiment, the first portions 11 may be substantially rectilinear and substantially parallel to the surface 2b of the inner ferrule.

Also, the second portions 12 may be substantially U-shaped, with the bottoms 13 of the Us facing and being offset from the outside surface 2b of the inner ferrule 2.

Also, to avoid any risk of the outer enclosure 3 corroding, the width of the bases 13 of the second portions 12 is less than the width of the opening 15 of the U-shapes of the second portions 12 such that the sides 14 of the U-shapes slope perceptibly relative to the outside surface 2b of the inner ferrule 2.

Provision may also be made for the bases 13 of the second portions 12 to be substantially rectilinear and substantially parallel to the outside surface 2b of the inner ferrule 2.

The sides 14 may also be substantially rectilinear.

In an embodiment as shown by way of example in FIG. 3, the undulations 7 are formed by an alternating succession of first and second portions 11 and 12 of respective determined widths.

Insofar as the cooling fluid is in thermal contact with the inner ferrule 2 and with the outer enclosure 3, both of them may be made out of substantially identical material, and in particular a metal alloy that withstands corrosion.

That said, it is necessary for the inner ferrule 2 to be thermally conductive, whereas it is not essential for the outer enclosure 3 to be made of a material that conducts heat.

To obtain good sealing at the feed inlet 4 and at the exhaust outlet 5, they may communicate with an external fluid source (not shown) via pipe bends 16 mounted inside the inner ferrule 2.

According to the invention, the structure of the outer enclosure 3 can be obtained by plastic deformation, thereby making it possible to obtain an inner ferrule 2 and an outer enclosure 3 that are both relatively thin.

The undulations 7 serve to stiffen the outer enclosure 3 and thus make it possible to reduce the thickness thereof while still retaining the same mechanical strength against deformation.

The dimensions of said thicknesses are determined, in particular, by the suitability of the enclosure for deformation.

By way of non-limiting example, the thickness of the inner ferrule 2 lies in the range about 1 mm to about 5 mm, the thickness of the outer enclosure 3 lies in the range about 0.5 mm to 1.5 mm, and the thickness of the passage—defined and delimited by the undulations 7 and the ferrule 2 lies in the range about 1 mm to about 10 mm.

The invention also relates to a rotary machine including a case 1 as described above. The case is designed to surround the stator of the rotary machine.

Finally, the invention relates to a method of making a case 1 as described above, in which the undulations 7 are created by plastic deformation of the outer enclosure 3, the inner ferrule 2 being placed inside the outer enclosure 3 as deformed in this way, and the outer enclosure 3 is welded in leakproof manner to the inner ferrule 2 via their respective ends 3b and 2c.

To ensure good sealing between the second portions 12 and the outside surface 2b of the ferrule 2, the outer enclosure 3 is fitted around the ferrule 2 without clearance.

This embodiment without clearance makes it possible, in particular, to avoid problems of purging if the inlet 4 and the outlet 5 are capable of taking up any position.

A satisfactory result can also be obtained with clearance, but under such circumstances, the inlet 4 and the outlet 5 need to be in a special position to allow air to be vented.

To obtain no clearance between the outer enclosure 3 and the inner ferrule 2, it is necessary for them to be assembled as a tight fit.

However, since the thickness of the outer enclosure 3 is relatively thin, it cannot withstand axial force when it is in the free state, and runs the risk of being deformed.

Consequently, to manufacture the case of the invention, the procedure is as follows:

Use is made of tooling 16 comprising, for example, two half-matrices 16a and 16b associated with a bell 17 for holding the two half-matrices.

The two half-matrices 16a and 16b, once secured one to the other, define a recess 18 for receiving a base element (not shown) that is to form the outer enclosure 3.

The inside faces of the half-matrices 16a and 16b have undulations 19 that are complementary in shape to the undulations 7 that are to be obtained on the outer enclosure 3.

The half-matrices 16a and 16b are fixed together by fixing means 20 so as to obtain the desired recess 18 that is open at each end.

One of the openings is closed by positioning the bell 17 around the two half-matrices 16a and 16b that has been fixed together.

The base element for forming the outer enclosure 3 is placed in the recess 18.

Thereafter, an element made of a material that is substantially incompressible (not shown), such as incompressible rubber is used to form the imprint of the matrix on the base element that is to form the outer enclosure 3.

To this end, the element of substantially incompressible material is placed inside the outer enclosure 3 against the inside walls 3c thereof, and said element is then compressed so as to deform the side walls 3c of the outer enclosure 3, thus obtaining the undulations 7 on the side walls 3c of the outer enclosure 3.

Thereafter, the bell is removed, but the outer enclosure 3 as deformed in this way is left inside the recess 18 so that it is held in its deformed state by the half-matrices 16a and 16b.

The inner ferrule 2 can thus be engaged inside the outer enclosure 3 by forcing it in under pressure without deforming the outer enclosure 3 in spite of the fact that it is of relatively small thickness.

We claim:

1. A rotary electrical machine comprising a stator and cooling case surrounding said stator, said cooling case comprising:
    a thermally conductive inner ferrule for surrounding the electrical device, the inner ferrule being a body of revolution; and
    an outer enclosure adjacent to the outside surface of the inner ferrule and including a feed inlet and an exhaust outlet for a cooling fluid, the outer enclosure being in the form of a plurality of undulations,
    the undulations comprising:
        first portions in contact with the outer surface of the inner ferrule, and
        second outer portions offset from the outer surface of the inner ferrule and, cooperating with the inner ferrule, defining a passage for the cooling fluid,
        the first and second portions being rigidly connected to each other;
        the passage for the cooling fluid extending from the inlet to the outlet and being helical in shape; the inner ferrule being suitable for coming into thermal contact with the cooling fluid; and
        wherein the undulations are such that the passage includes two substantially parallel sections that communicate with each other at one end via a bend such that the fluid inlet and the fluid outlet are located substantially towards the same free opposite ends of said sections.

2. A cooling case for an electrical device, the case comprising:
    a thermally conductive inner ferrule for surrounding the electrical device, the inner ferrule being a body of revolution; and
    an outer enclosure adjacent to the outside surface of the inner ferrule and including a feed inlet and an exhaust outlet for a cooling fluid, the outer enclosure being in the form of a plurality of undulations,
    the undulations comprising:
        first portions in contact with the outer surface of the inner ferrule, and
        second outer portions offset from the outer surface of the inner ferrule and, cooperating with the inner ferrule, defining a passage for the cooling fluid,
        the first and second portions being rigidly connected to each other;
        the passage for the cooling fluid extending from the inlet to the outlet and being helical in shape; the inner ferrule being suitable for coming into thermal contact with the cooling fluid; and
        wherein the undulations are such that the passage includes two substantially parallel sections that communicate with each other at one end via a bend such that the fluid inlet and the fluid outlet are located substantially towards the same free opposite ends of said sections.

3. A case according to claim 2, wherein the undulations are such that the passage extends in a plane substantially perpendicular to the axis of revolution of the inner ferrule.

4. A case according to claim 2, wherein the inner ferrule is substantially cylindrical in shape.

5. A case according to claim 2, wherein the two free ends of the sections of the passage are located close to each other in a plane substantially perpendicular to the longitudinal axis of the outer enclosure.

6. A case according to claim 2, wherein one of the fluid inlet and the fluid outlet communicates with an external fluid source via a pipe bend mounted inside the inner ferrule.

7. A case according to claim 2, wherein the outer enclosure, once positioned adjacent to the inner ferrule, is rigidly fixed thereto by leakproof welding at its two ends.

8. A case according to claim 2, wherein the first portions are substantially rectilinear and substantially parallel to the surface of the inner ferrule.

9. A case according to claim 2, wherein the second portions are substantially U-shaped, with the base of the U-shape facing and offset from the surface of the ferrule and being of a width that is smaller that the width of the opening of the U-shape.

10. A case according to claim 9, wherein the base of the U-shape is substantially rectilinear and substantially parallel to the surface of the ferrule.

11. A case according to claim 9, wherein the sides of the U-shape are substantially rectilinear.

12. A case according to claim 2, wherein the undulations are formed by an alternating succession of first and second portions.

13. A case according to claim 2, wherein the ferrule and the outer enclosure are made of the same material.

14. A case according to claim 13, wherein said same material is a corrosion resistant metal alloy.

15. A case according to claim 2, wherein the ferrule and outer enclosure are adapted for use with a liquid cooling fluid.

16. A case according to claim 2, wherein the ferrule and outer enclosure are adapted for use with a gaseous cooling fluid.

17. A method of manufacturing a cooling case for an electrical device, comprising the steps of:

providing a thermally conductive inner ferrule for surrounding the electrical device, the inner ferrule being a body of revolution; and providing an outer enclosure for attachment to the outside surface of the inner ferrule, said outer enclosure including a feed inlet and an exhaust outlet for a cooling fluid, and the outer enclosure being in the form of a plurality of undulations, the undulations comprising:

first portions in contact with the outer surface of the inner ferrule, and second outer portions offset from the outer surface of the ferrule and designed to define a passage for the cooling fluid when attached cooperatingly with the inner ferrule;

the first and second portions being rigidly connected to each other;

the passage for the cooling fluid extending from the inlet to the outlet and being helical in shape; the inner ferrule being suitable for coming into thermal contact with the cooling fluid;

wherein the undulations are such that the passage includes two substantially parallel sections that communicate with each other at one end via a bend such that the fluid inlet and the fluid outlet are located substantially towards the same free opposite ends of said sections, and wherein the undulations are created by plastic deformation of the outer enclosure;

fitting the inner ferrule inside the outer enclosure deformed in this way; and welding the outer enclosure to the inner ferrule in leakproof manner via their ends.

18. The method of claim 17, wherein said fitting step fits the inner ferrule to the outer enclosure without clearance.

19. The method of claim 17, wherein said providing an outer enclosure step further comprises the steps of:

positioning a base element for being formed into the outer enclosure in tooling having undulations on inside faces that are complementary in shape to the undulations that are to be formed on the outer enclosure;

placing a substantially incompressible material inside the base element so that the material fills the interior of the base element and contacts an interior wall of the base element;

compressing the tooling against an exterior wall of the base element so as to deform the exterior wall to obtain the undulations and to transform the base element into the outer enclosure; and removing the material from the interior of the thus-formed outer enclosure; and wherein the fitting step further comprises the step of fitting the inner ferrule in the outer enclosure so that the tooling functions to hold the outer enclosure in its deformed state.

* * * * *